Sept. 23, 1947.　　C. R. BLOSSER ET AL　　2,427,946
THERMOSTATIC SWITCH
Filed Sept. 20, 1945
Fig. 1
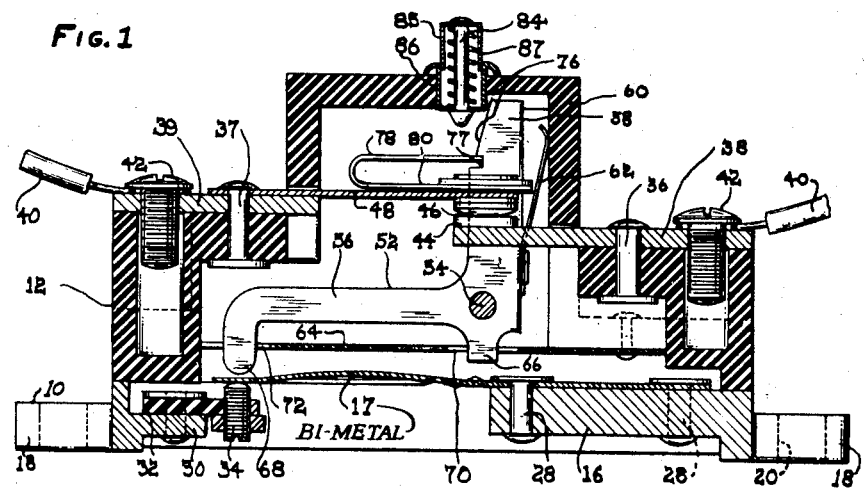
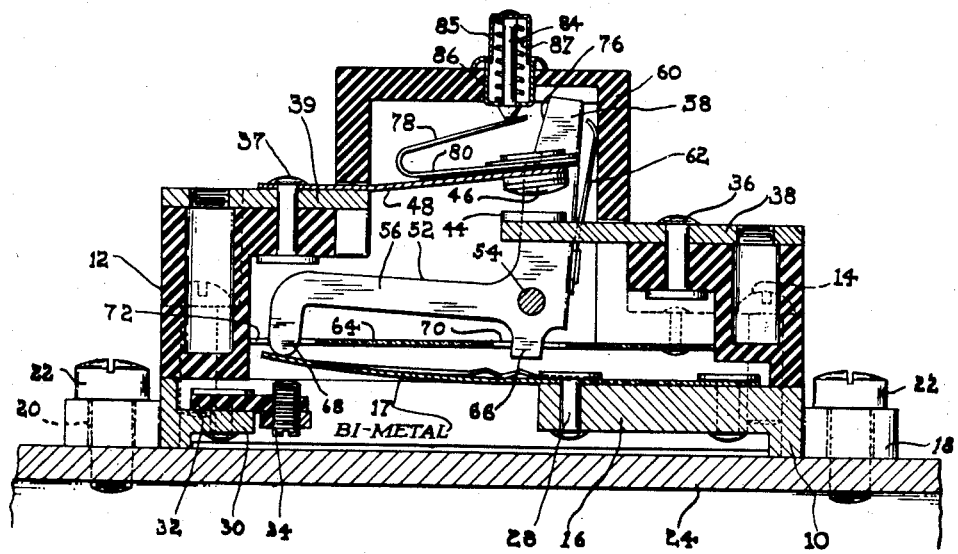
Fig. 2
WITNESSES:
Louis Necko
E. H. Lutz
INVENTORS
CHARLES R. BLOSSER
EARL K. CLARK
BY R. J. Eisinger
ATTORNEY Patented Sept. 23, 1947

2,427,946

UNITED STATES PATENT OFFICE 2,427,946

THERMOSTATIC SWITCH

Charles R. Blosser, Shelby, and Earl K. Clark, Mansfield, Ohio, assignors to Westinghouse Electric Corporation, East Pittsburgh, Pa., a corporation of Pennsylvania Application September 20, 1945, Serial No. 617,642

6 Claims. (Cl. 200—139)

This invention relates to an over-temperature control device for limiting the temperature of an electrically-heated apparatus, such as a hot water tank or the like, to a predetermined maximum value. More specifically, the invention relates to a temperature control device of the type which includes means for preventing resetting of the switch controlling the energization of the heating element of the apparatus until the temperature of a heat-responsive member, which forms part of the switch, has dropped to a predetermined low value, and in which the switch must be manually closed before the heating element can be re-energized.

One object of the invention is to produce an improved over-temperature control device of the type set forth.

A further object is to produce an improved over-temperature control device in which the calibration of the heat-responsive member is not affected by the assembly of the device, or by its application to the apparatus the temperature of which is to be controlled.

A still further object of the invention is to produce an improved over-temperature control device in which the movement of the heat-responsive member is not hindered by friction or other impediments so that the switch will always open as soon as the temperature of the apparatus has reached the predetermined maximum value, with little, if any variation or differential.

A still further object is to devise an improved temperature control device which can be accurately and economically manufactured by mass production methods.

These and other objects are effected by the invention as will be apparent from the following description and claims taken in connection with the accompanying drawings, forming a part of this application, in which:

Fig. 1 is a vertical sectional view of an improved temperature control device showing the position the various parts will assume when the switch is closed; and Fig. 2 is a view, similar to Fig. 1, showing the position the parts will assume when the temperature has reached the maximum predetermined value but before the temperature of the heat-responsive member itself has dropped to a predetermined low value.

In the preferred embodiment illustrated, there is shown a temperature control device including a base 10 and a cover 12, the base and cover being suitably secured together by bolts 14. The base 10 is made of material having high heat conductivity, such as brass, and includes a portion 16, for a supporting a heat-responsive member 17, and pendant lugs 18 having apertures 20 through which bolts 22 may pass to secure the temperature control device to a wall or other part 24 of a hot water tank or other apparatus, the temperature of which is to be controlled.

The heat-responsive member 17 is permanently secured to the upper surface of the supporting portion 16 of the base by means of rivets 28, and it will be noted that a relatively large portion of the heat-responsive member is in intimate contact with the portion 16 of the base 10, so that there will be very little temperature differential, if any, between the heat-responsive member and the wall 24 of the tank.

The heat-responsive member is of the snap-acting type and is made of bimetal, with the metal having the higher coefficient of expansion on the underside of the member, as viewed in the drawings, so that, upon heating, the free end of the heat-responsive member will snap from the position shown in Fig. 1 to the position shown in Fig. 2, and vice versa. The particular structure of the heat-responsive member forms no part of the present invention and is, therefore, not shown or described in detail. It is, however, pointed out that the heat-responsive member is calibrated so as to move in switch-opening direction when heated to a predetermined temperature value.

According to this invention, the heat-responsive member is calibrated after it is secured to the base. This is important, not only from the standpoint of reduced manufacturing costs, but also from the standpoint of accuracy of the finished control device. Thus, if the heat-responsive member is first calibrated and is subsequently fastened to the base 10 or other support, the fastening operation will change the temperature value at which the heat-responsive member will snap over, thus necessitating further calibration if the heat-responsive member is to open the switch at the desired temperature value. In the structure disclosed, the base is formed separately from the cover so that the bimetal member may be calibrated after it has been secured to the base and so that securing the base to the cover, or securing the assembled base and cover to a hot water tank or other apparatus, will not in any way affect the calibration of the heat-responsive member. Also, the base and cover are so arranged as to provide sufficient space in which the heat-responsive member can move freely, and so that the movement of the heat-responsive member, in either direction, is not hampered by friction, by springs, or by other outside forces which must be overcome before the heat-responsive member can move from the position of Fig. 1 to the position of Fig. 2. In other words, the heat-responsive member will snap over as soon as the temperature to which it has been calibrated is reached. By this means, and because of the intimate heat exchange relation between the wall 24 of the tank and the heat-responsive member, the switch will be opened uniformly exactly at, or very close to, the predetermined maximum temperature value.

Provision is also made for adjusting the heat-responsive member to vary the temperature at which it will snap from the position shown in Fig. 1 to the position shown in Fig. 2. As shown, the base 10 is provided with a lug or extension 30, which carries an insulating strip 32. The insulating strip 32 carries an adjustment screw 34 on which the free end of the heat-responsive member rests when the switch is closed, as shown in Fig. 1. By lowering or raising the screw 34, the temperature at which the heat-responsive member will snap over to switch-opening position may be increased or decreased, as desired.

The cover member 12 is preferably made of heat and electric insulating material and with the base forms an enclosure for the component parts of the control device.

The cover 12 has secured thereto, by rivets 36 and 37, a pair of conducting plates 38 and 39. The plates 38 and 39 are provided with tapped holes for engaging screws 42 which are suitably connected to wires 40 of the circuit energizing the heating element (not shown) of the tank 24. The plate 38 carries a stationary contact 44 which is adapted to coact with a movable contact 46, carried by a movable spring contact arm 48, which is secured, in electric conducting relation, to the plate 39 by the rivet 37.

The cover 12 also carries means for opening the switch in response to the snapping over of the heat-responsive member 17, and manually-operated means for reclosing of the switch, or resetting the control device, when the temperature of the heat-responsive member has fallen to a predetermined low value. As shown, there is provided a bell crank 52 which is freely rotatable, in either direction, about the axis of a pivot pin 54 carried by opposite side walls of the cover 12. The bell crank includes an arm 56, which overlies the heat-responsive member 17, and an arm 58, which is angularly spaced from the arm 56 and disposed adjacent a wall 60 of the cover. The bell crank is biased in counterclockwise direction, as viewed in the drawing, by a spring 62 confined between the arm 58 of the bell crank and the wall 60.

Between the arm 56 of the bell crank and the heat-responsive member is a baffle 64, preferably made of heat insulating material, for shielding the heat-responsive member from heat other than the heat of the tank 24. The arm 56 of the bell crank is provided with a pendant guide lug 66 and a finger 68. The guide lug 66 movably engages a narrow slot 70 formed in the baffle 64 so as to prevent displacement of the bell crank longitudinally of the pivot pin 54. It will be understood that other convenient means may be used for this purpose. The finger 68 extends through an opening 72, also formed in the baffle, with the lower end thereof disposed adjacent the free end of the heat-responsive member. It will be noted from Fig. 1 that, when the switch is closed, the lower end of the finger 68 is in the path of movement of the adjacent end of the heat-responsive member but is slightly spaced therefrom. By this arrangement, the heat-responsive member is free to snap over without any hindrance and the finger 68 is in a position to receive the full force of impact of the free end of the heat-responsive member as the latter snaps over from the position of Fig. 1 to that of Fig. 2. In other words, the finger 68 is subjected to the sudden and violent impact of the rapidly moving free end of the heat-responsive member, so as to move the bell crank in clockwise direction, as viewed in the drawings, to open the switch, as will be hereinafter more fully explained.

Means is also provided for retaining the switch in its closed position, and for maintaining adequate engagement of the contacts 44 and 46 until the switch is opened by movement of the heat-responsive member. As shown, the arm 58 is provided with a slanting edge 76 which leads to a notch 77, and the movable contact arm 48 is provided with a latching member 78, the free end of which is adapted, when the switch is closed, to engage said notch. In the preferred embodiment illustrated, the latching member 78 forms one arm of a U-shaped leaf spring, the other arm 80 of which is secured, in electrically-insulated relation, to the movable contact arm 48.

To re-engage the free end of the member 78 with the notch 76 of the arm 58, after the switch has been opened, as shown in Fig. 2, the top wall of the cover is provided with an opening through which a pin or the like may be inserted to push the arm 78, from the position shown in Fig. 2, to the position shown in Fig. 1.

A convenient mechanism for accomplishing this purpose includes a pin 84 carried by a sleeve 85 which is vertically slidable in a sleeve 86. The sleeve 85 and the pin 84 are normally biased out of contact with the arm 78, by a spring 87.

It will be understood that an over-temperature control device of the type described is used in conjunction with an automatic cycling type thermostat (not shown) which is adjusted to open and close the circuit of the heating element of the tank at predetermined high and low temperature values so as to maintain the tank at a desired mean temperature value. When so used, the over-temperature control device is connected to the circuit of the heating element in series with the automatically cycling thermostat so that the circuit of the heating element can be closed only as long as the switch of the over-temperature control device is also closed, or is in the position shown in Fig. 1. Since the function of the over-temperature control device is to open the switch so as to guard against excessive temperature which will result only when, and if, the automatically cycling thermostat fails to open the circuit at the predetermined high temperature value to which it is adjusted, it follows that the low temperature value at which the bimetal member 17 will move to switch-closing position should be higher than the temperature value at which the automatically cycling thermostat will open the circuit. For example, if the automatically cycling thermostat is adjusted to open the circuit of the heating element at, say, 160° F., the temperature at which the bimetal member 17 will move to the switch-closing position of Fig. 1 will be sufficiently above 160° F. to insure that, as long as the automatically cycling thermostat is functioning properly, the over-temperature control will not open the circuit which is then solely under control of the automatically cycling thermostat.

The temperature value at which the over-temperature control device will open the circuit will be selected according to the type of apparatus the temperature of which is to be controlled. In the case of a hot water tank, the temperature value selected will be somewhat below the boiling point of the water, and the bimetal member 17 will be calibrated and adjusted to open the switch at a selected temperature value between 160° F. and 212° F.

Operation

In Fig. 1, the switch is shown closed and the circuit of the heating element of the apparatus 24 can be closed and opened by automatically cycling thermostat (not shown) so as to maintain the temperature of the tank at the desired value. In this position, the free end of the heat-responsive member 17 rests on the adjusting screw 34 and the operating finger 68 of the bell crank is slightly spaced from the heat-responsive member. Also, in this position the free end of the spring latch 78 is engaged in the notch 77 of the upper arm 58 of the bell crank so as to retain the switch in closed position and to keep the contacts 44 and 46 in firm engagement. Should the automatically cycling thermostat fail to open the circuit at the desired temperature, the temperature of the heat-responsive member will rise until it reaches the value to which this member has been calibrated and adjusted, whereupon the heat-responsive member will be distorted until the stresses therein approach and pass a state of equilibrium. When this takes place, the free end of the heat-responsive member snaps over, from the position shown in Fig. 1, to the position shown in Fig. 2. In snapping over, the heat-responsive member strikes the finger 68 and rotates the bell crank in clockwise direction against the biasing action of the spring 62, into the position shown in Fig. 2. The rotation of the bell crank in clockwise direction disengages the free end of the spring latch 78 from the notch 77 and permits the movable contact arm 48 to spring upwardly, thus moving the contact 46 away from the contact 44 and breaking the circuit energizing the heating element of the apparatus 24.

As long as the temperature of the heat-responsive member is above its critical or snap-over value, the heat-responsive member will remain in the position shown in Fig. 2, in which its free end presses upwardly against the finger 68, thus retaining the bell crank in the position shown in Fig. 2, against the action of the spring 62. In this position of the bell crank, the guide edge 76 and the notch 77 of the arm 58 are out of reach of the free end of the latch 78 so that, if the latter is depressed by the pin 84, it will not reach nor engage the notch 77. This prevents resetting of the control device as long as the temperature of the heat-responsive member is above the value at which it will snap back from the position shown in Fig. 2 to the position shown in Fig. 1. Since the temperature of the heat-responsive member is dependent upon the temperature of the apparatus 24, it follows that the control device cannot be reset, until the temperature of the apparatus has fallen to a predetermined low value.

When its temperature has fallen to the desired predetermined low value, the heat-responsive member 17 snaps over from the position shown in Fig. 2 to the position shown in Fig. 1 in which the free end of the heat-responsive member is disengaged from the finger 68 of the bell crank. When this takes place, the spring 62, acting on the arm 58, biases the bell crank in counterclockwise direction, as viewed in the drawings, so as to bring the guide edge 76 and the notch 77 into position to be engaged by the free end of the latch 78. With the parts in this position, the pin 84 is depressed so as to depress the latch 78 and cause the free end thereof to slide downwardly on the slanted guide edge 76 until it reaches and enters the notch 77. The upward pressure of the free end of the latch 78 against the upper wall of the notch 77 and the biasing action of the spring 62 cooperate to retain the parts in the position shown in Fig. 1, until the switch is again opened in the manner above explained.

The biasing action of the U-shaped leaf spring, when compressed, as shown in Fig. 1, is exerted upon the movable contact arm 48, thus insuring proper engagement of the movable contact 46 with the stationary contact 44 as long as the switch is closed.

While the invention has been shown in but one form, it will be obvious to those skilled in the art that it is not so limited, but is susceptible of various changes and modifications without departing from the spirit thereof.

What is claimed is:

1. A temperature control device comprising a heat-conducting base adapted to be secured to a body the maximum temperature of which is to be controlled, a snap-acting, heat-responsive member including a first portion fixed to said base and a second portion free to move in response to temperature conditions, said heat-responsive member being adapted to be calibrated, after said first portion is fixed to said base, to snap over to a first position when its temperature reaches a predetermined low value and into a second position when its temperature reaches a predetermined high value, an adjustment screw carried by said base near the free end of said snap-acting member to vary the temperature at which said second portion will snap over from said first position to said second position, said base, said snap-acting member and said adjustment screw being secured together to form a unitary subassembly, said temperature control device further comprising a cover, a switch carried by said cover, and actuating means also carried by said cover and operable upon movement of said second portion of said snap-acting member from its first position to its second position to open said switch, said cover, said switch and said actuating means being secured together to form a second unitary subassembly, and means for securing said two subassemblies together, with said actuating means disposed in the path of movement of said second portion of said snap-acting member.

2. The structure recited in claim 1 together with means for latching the switch in closed position when said heat-responsive member is in said first position.

3. The structure recited in claim 1 together with means for latching the switch in closed position when said heat-responsive member is in said first position, and means for preventing latching of said switch in said closed position as long as the temperature of the snap-acting member is above a predetermined low value.

4. A temperature control device for limiting the maximum temperature of an electrically-heated body, said control device including a heat-conducting base adapted to be secured in heat exchange relation to said body, a snap-acting heat-responsive member having a portion thereof secured in intimate heat exchange relation to said base, the remaining portion of said snap-acting member being calibrated, after said heat-responsive member has been secured to said base, so as to move to switch-opening position when its temperature reaches a predetermined high value, said remaining portion of said snap-acting member being adapted to move to switch-closing position when its temperature reaches a predetermined low value, said temperature control device further including a cover adapted to be secured to said base, a switch carried by said cover for controlling the circuit of the heating element of said body, said switch including a fixed contact, a movable contact, and a spring arm carrying said movable contact and normally biased in switch-opening direction, a movable member including a first arm and a second arm, there being a notch in said first arm, a spring latch operatively connected to said spring arm and adapted, in one position of said movable member, to engage said notch and to exert yielding pressure against said spring arm in switch-closing direction, said second arm of said movable member being disposed in the path of movement of said snap-acting member, whereby, when said snap-acting member moves to switch-opening position, said first arm of said movable member is moved away from said latch member and disengages said latch member from said notch, and yielding means acting on said movable member to move said first arm thereof toward said latch, the force exerted by said yielding means being smaller than the force exerted by said snap-acting member in moving from switch-closing to switch-opening position.

5. A temperature control device including a supporting base made of good heat conducting material, means securing said base in intimate heat conducting relation to an electrically-heated body the maximum temperature of which is to be controlled, a snap-acting heat-responsive member, means for securing one portion of said member in intimate heat-conducting relation to said base, the other portion of said snap-acting member being free to snap over, to a first position, when the temperature of said heat-responsive member falls to a predetermined low value, and to a second position when the temperature of said snap-acting member rises to a predetermined high value, an insulating cover adapted to be secured to said base to form a casing enclosing said snap-acting member, a switch carried by said cover, said switch including a stationary contact, a movable contact adapted to engage said stationary contact, and a spring arm carrying said movable contact and normally biasing said movable contact away from said stationary contact to open said switch, a bell crank movably carried by said cover, said bell crank including a first arm and a second arm, there being a notch in said second arm, a spring latch member carried by said spring arm and adapted to engage said notch, and a spring biasing said bell crank in a direction to move said second arm towards said latch member, said second arm, said notch and said latch member being so arranged that when said latch member engages said notch, it biases said spring arm in the direction to close said switch, said first arm of said bell crank being disposed in the path of movement of the free portion of said snap-acting member, whereby when said other portion of said snap-acting member snaps over from said first position to said second position, said bell crank is moved in the direction to move said second arm thereof away from said latch member to cause said latch member to be disengaged from said notch to permit said spring arm to move said movable contact out of engagement with said stationary contact, thereby to open said switch.

6. The structure recited in claim 4 together with means for re-engaging said latch with said notch for retaining said switch in closed position, said means being operable only when said remaining portion of said snap-acting member is in its switch-closing position.

CHARLES R. BLOSSER.
EARL K. CLARK.

REFERENCES CITED

The following references are of record in the file of this patent:

UNITED STATES PATENTS

| Number | Name | Date |
| --- | --- | --- |
| 1,836,442 | Burt | Dec. 15, 1931 |
| 1,530,730 | Leeb | March 24, 1925 |
| 1,735,269 | Ellis | Nov. 12, 1929 |